Patented Feb. 26, 1952

2,587,478

UNITED STATES PATENT OFFICE 2,587,478

METHOD OF PRODUCTION OF PYRETHRIN CONCENTRATE FROM WHOLE PYRETHRUM FLOWERS

Michael Alexis Jernakoff, New York, N. Y., George H. Batt, Elizabeth, and Nicholas A. Sankowsky, Scotch Plains, N. J., assignors, by mesne assignments, to Standard Oil Development Company, a corporation of Delaware No Drawing. Application August 2, 1947,
Serial No. 765,812

2 Claims. (Cl. 260—468)

This invention relates to an improved method of extracting pyrethrins from pyrethrum flowers. More particularly, it relates to an improved method for preparing concentrated pyrethrin extracts from pyrethrum flowers.

Pyrethrum flowers are utilized a great deal for their insecticidal properties. The active toxic ingredients known as pyrethrins have been extracted from the dried flowers and leaves of the various species of pyrethrum plants. Various organic solvents such as kerosene, gasoline, petroleum ethers, chlorinated hydrocarbons, or mixtures of these materials have been used as the extraction media.

The principal difficulty with conventional extraction methods has been that they resulted in the simultaneous extraction of inert materials such as resins, waxes and greases from the ground flowers. These undesirable substances, hereafter referred to as inert materials, which may constitute as much as 85% of the extracted matter in the menstruum, have no insecticidal activity, dilute the active ingredients, and are difficult to separate from the latter substances.

Numerous investigations have been made in efforts to obtain higher concentrations of the toxic matter and lower concentrations of the inert materials. Short and long extraction periods have been tried with heated solvents. The solvent material often had to be evaporated off in order to increase the concentration of the toxic material, when the menstruum was to be used directly for spraying.

These various methods aimed at increasing the concentration of toxic materials have largely been ineffective and in addition have actually lessened the toxicity of the pyrethrins. The latter substances are unstable and tend to deteriorate on prolonged exposure to air, light and heat. The previously mentioned methods actually increased this instability by the additional heating and handling operations entailed.

One of the objects of this invention is to provide a simple method of obtaining concentrated pyrethrin solutions. Another object is to provide a method of obtaining stable pyrethrin solutions. Another object is to provide a method for extracting pyrethrins that is relatively inexpensive and rapid.

It has now been found that a major proportion of the undesirable inert materials can be removed by first extracting the whole pyrethrum flowers with a suitable solvent. When the resulting marc, after being dried and ground, is again extracted with a fresh portion of solvent, an unusually concentrated and potent pyrethrin extract is obtained.

It is believed that the reason for the accomplishment of this invention may lie in the fact that the inert materials are mainly at the surface of the various parts of the flowers. When the whole flowers are contacted with the solvent it is principally these materials that are most readily removed. The active portion or pyrethrins may then be made more accessible to the action of fresh solvent by the rupturing and breaking of the cell walls that occur in the grinding of the flowers.

Any solvent having high pyrethrin extracting properties may be used. The nature of the solvent may vary with the intended uses of the final product. Thus, if the final product is intended for spraying, a volatile solvent should be used. Kerosene, naphtha, and other petroleum distillates have been found to be suitable.

For the purpose of illustration, and to make this invention more readily understood, a preferred mode of operation will be described and a typical result discussed.

The whole flowers are first batch extracted with the solvent, and this extract is discarded. The marc or flower residue is then dried or not depending on solvent and conditions, and ground to a fine powder. All drying and grinding operations are carried out in the conventional manner for the extraction of pyrethrins. These need not be discussed here as they are known in the art. The macerated marc is then treated with a fresh portion of the solvent to extract the pyrethrins. This operation may be carried out in a vessel with agitation, an expeller, or through a column of the macerated mass or any other conventional method of extraction. The conventional quantities of solvent may be used. The second extract thus obtained may be further diluted or additional solvents added in compounding for commercial preparations.

The following example indicates an embodiment of the invention and the nature of the results obtained by the hereinbefore described method.

200 gms. of whole Kenya flowers were batch extracted four times with petroleum ether at room temperature and atmospheric pressure. 1000 cc. of the solvent were used on the dry flowers and 750 cc. on the wet flowers after draining the menstruum for the various stages. The total extracted material aggregated 6.13 gms. Of the latter figure 98.5% were inert materials and 1.5% were pyrethrins. The resulting marc was then dried, ground and again extracted four times with fresh solvent. The total yield of this series of extractions was 3.87 gms. of extracted material of which 45% were pyrethrins. When the flowers are ground and then extracted, as in the conventional manner, the extracted materials contain only about 20% pyrethrins. The pyrethrin concentration can thus be seen to be increased more than 100% by the method of this invention and an extract of higher toxic value per unit is obtained.

One advantage of this invention is that it can be adapted and combined with other processes for the preparation of pyrethrin concentrates. Another advantage lies in its ease and rapidity of operation. Still another advantage is the high potency of the pyrethrin concentrate obtained because of the limited number of operations entailed and the avoidance of necessity for high temperatures.

This invention has been described with respect to preferred modification but various changes and alternative procedures may be adopted within the scope of the appended claims.

What is claimed:

1. A process for obtaining strong extracts of pyrethrins from whole pyrethrum flowers which comprises the steps of contacting the whole unground pyrethrum flowers with petroleum distillate pyrethrin solvent at atmospheric pressure and temperature to obtain an extract of predominantly inert materials from the whole flowers; discarding this extract containing predominantly the inert materials; comminuting the resultant marc; contacting the comminuted marc with fresh petroleum distillate pyrethrin solvent at atmospheric pressure and temperature; and withdrawing the resulting strong pyrethrin extract.

2. A process as in claim 1 in which the petroleum distillate is petroleum ether.

MICHAEL ALEXIS JERNAKOFF.
GEORGE H. BATT.
NICHOLAS A. SANKOWSKY.

REFERENCES CITED

The following references are of record in the file of this patent:

UNITED STATES PATENTS

| Number | Name | Date |
|---|---|---|
| 1,786,967 | Trevillian | Dec. 30, 1930 |
| 1,933,077 | Sankowsky | Oct. 31, 1933 |
| 2,066,737 | Muskat | Jan. 5, 1937 |